(12) United States Patent
DesJardins et al.

(10) Patent No.: US 6,965,636 B1
(45) Date of Patent: Nov. 15, 2005

(54) SYSTEM AND METHOD FOR BLOCK ERROR CORRECTION IN PACKET-BASED DIGITAL COMMUNICATIONS

(75) Inventors: Philip DesJardins, Nevada City, CA (US); Andrew L. Norrell, Nevada City, CA (US)

(73) Assignee: 2Wire, Inc., San Jose, CA (US)

(*) Notice: Subject to any disclaimer, the term of this patent is extended or adjusted under 35 U.S.C. 154(b) by 977 days.

(21) Appl. No.: 09/704,236

(22) Filed: Oct. 30, 2000

Related U.S. Application Data (60) Provisional application No. 60/179,588, filed on Feb. 1, 2000.

(51) Int. Cl.[7] .............................. H04B 1/38; H04L 5/16
(52) U.S. Cl. ...................... 375/219; 714/774; 714/751; 714/704; 714/705; 714/706; 714/707; 714/708; 341/50
(58) Field of Search ........................ 375/219; 714/774, 714/751, 704–708; 370/468; 341/50

(56) References Cited

U.S. PATENT DOCUMENTS

| | | | |
|---|---|---|---|
| 5,699,365 A * | 12/1997 | Klayman et al. ........... 714/708 |
| 6,058,500 A | 5/2000 | DesJardins et al. ......... 714/751 |
| 6,128,282 A * | 10/2000 | Liebetreu et al. ........... 370/235 |
| 6,178,194 B1 * | 1/2001 | Vasic .......................... 375/136 |
| 6,205,410 B1 * | 3/2001 | Cai .............................. 702/191 |
| 6,314,535 B1 * | 11/2001 | Morris et al. ............... 714/708 |
| 6,388,587 B1 * | 5/2002 | Brickner et al. ............. 341/59 |
| 2003/0185181 A1 * | 10/2003 | Balachandran et al. ..... 370/337 |

* cited by examiner

*Primary Examiner*—Stephen Chin
*Assistant Examiner*—Harry Vartanian
(74) *Attorney, Agent, or Firm*—Blakely, Sokoloff, Taylor & Zafman LLP (57) ABSTRACT

A system and method for efficiently correcting block errors in packet-based digital communications are provided whereby the ratio of redundant symbols/message symbols over the length of a data packet decreases in order to more efficiently use available bandwidth. The reduction of this ratio, and subsequently the change in a corresponding framing schedule, may be determined through negotiations between the transmitting device and the receiving devices. Each receiving device calculates a redundancy requirement based on signal-to-noise ratio samples. This requirement is returned to the transmitting device in the form of a schedule request. The transmitting device determines if a new framing schedule is needed based on the schedule request, and communicates this new framing schedule to the receiving device. Once the receiving device acknowledges receipt of the new schedule, the transmitting device switches to the new framing schedule for future data packet transmissions.

24 Claims, 5 Drawing Sheets

| K Data Symbols | $R_1$ Redundant Symbols | K Data Symbols | $R_2$ Redundant Symbols | K Data Symbols | $R_3$ Redundant Symbols | K Data Symbols | $R_4$ Redundant Symbols |
|---|---|---|---|---|---|---|---|

SYSTEM AND METHOD FOR BLOCK ERROR CORRECTION IN PACKET-BASED DIGITAL COMMUNICATIONS

CROSS-REFERENCE TO RELATED APPLICATION

This application claims the priority of U.S. Provisional Patent Application Ser. No. 60/179,588 entitled "Block Error Correction for Packet-Based Digital Communication," filed on Feb. 1, 2000, the subject matter of which is hereby incorporated by reference.

BACKGROUND

1. Technical Field

The present system and method relate generally to network data transmission, and more particularly to efficient block error correction for packet-based digital communications.

2. Description of the Background Art

Packet-based digital communications methods are frequently used when multiple intercommunicating transceivers share a common medium. Two examples of packet-based digital communications are communications transmitted according to Ethernet and Phoneline Networking Transceiver (referred to herein as "PNT") standards. Details regarding the PNT standard are disclosed in "G.pnt: Basic Framing Considerations", also known as ITU document FI-098 (referred to herein as "reference [1]") as submitted to the International Telecommunications Union in consideration for standardization, the disclosure of which is incorporated herein by reference.

In conventional packet-based communications, each receiver device typically operates with a generic initial condition at the beginning of each received data packet. As the packet is received, ongoing adaptive equalization and adaptive timing recovery improve the receiver's performance over the course of the received packet. Thus, the latter portions of packets tend to have a lower probability of received errors than the beginning portions of the packets.

Error correction coding may be used to improve the reliability of data transmission between transceivers, and is particularly useful in a noisy transmission medium. Error correction encoding typically involves the addition of redundancy, such as parity-check or redundant symbols, to data being transmitted over the communication network. Adding more redundancy to a packet allows a greater number of errors to be corrected, with the disadvantage that the transmission time increases to account for the redundant bits.

One type of a block error correction code commonly used in the art is Reed-Solomon (RS) coding. Reed-Solomon coding is typically used in fixed redundancy processes having high latency. In Reed-Solomon coding, the data stream is usually broken down, or divided, into blocks of symbols, where a symbol is a collection of M bits. In computer based communications, M is often equal to eight so that, in this instance, a symbol is synonymous with a byte. Redundant symbols are generated and appended to the end of the block of data (message) symbols, forming a codeword. The total length of the codeword is $N=2^M-1$ symbols. Generally, N=K+R, where K is the number of message symbols and R is the number of redundant symbols per codeword, so that the receiver is able to locate and correct R/2 symbols with errors.

As the ratio of R/K (number of redundant symbols/number of message symbols) increases, the error correction capability increases, with the disadvantage that more communications bandwidth is used for the redundant information as opposed to the message data. Reed-Solomon coding is therefore beneficial when the data rate increase that accompanies being able to correct errors outweighs the data rate lost to the redundant overhead.

In packet-based communications such as PNT, there is typically a higher probability of errors in the first few codewords of a packet as opposed to the latter few codewords of the packet due to the adaptation of the receiver to the transmission channel. Conventionally, K and R are substantially constant throughout the length of the packet; thus requiring a R/K ratio high enough to reliably correct the errors in the first few codewords. Unfortunately, such a high R/K value may be unnecessary for the succeeding codewords, which will likely have a lower error density. Communication bandwidth in these succeeding codewords is being lost to this unnecessary redundancy. Therefore, there is a need for a more efficient system and method for block error correction in packet-based digital communications.

SUMMARY

The present system and method overcome or substantially alleviate prior problems associated with block error correction in packet-based digital communications. In general, the present system and method provide efficient block error correction by decreasing the ratio of redundant symbols/message symbols over the length of a packet.

Because errors in digital packet-based communications tend to decrease over the length of the packet due to the adaptation of the receiving device to the communication channel, the redundancy requirement for error correction also decreases along the length of the packet. By providing a system and method for determining the redundancy requirements and negotiating the dynamic requirements between transmitting and receiving devices, the present system and method more efficiently uses available bandwidth than those which employ a constant ratio of redundant symbols/message symbols over the length of a packet.

According to one embodiment, a transceiver includes a framing schedule coordinator, a slicer, and a block error correction calculator. The slicer monitors received signals, and calculates a signal-to-noise ratio which is used by the block error correction calculator to calculate a redundancy requirement for the transceiver. This requirement is subsequently forwarded over a network to a broadcasting device in the form of a framing schedule request. The framing schedule coordinator in the broadcasting device then determines whether a new framing schedule based on the received request is advantageous and, if so, communicates the new framing schedule to receiving devices on the network.

In another embodiment, broadcasting and endpoint devices negotiate a forward or block error correction framing schedule based on the requirements of at least one of the endpoint devices. Pursuant to this method, the broadcaster sends packets to the endpoints. When an endpoint device decodes the received data packets, the endpoint device also calculates and forwards to the broadcaster the redundancy requirements of the endpoint as a schedule request. The broadcaster takes the schedule requests received from each responding endpoint device and determines a new framing schedule according to the received schedule request requiring the most redundancy. The broadcaster then forwards the new framing schedule to all of the endpoints. The broadcaster then waits for a schedule acknowledge message from each of the endpoints before beginning to transmit pursuant to the new framing schedule.

Accordingly, the present system and method efficiently correct block errors in packet-based digital communications by decreasing the redundancy of the transmitted data packet along the length of each packet. Moreover, a broadcasting device transmits data over a network to endpoint devices using the greatest amount of redundancy requested or required by an endpoint device. Other advantages, features, and embodiments of the present system and method will be apparent from the drawings and detailed description as set forth below.

DETAILED DESCRIPTION

Figure 1:
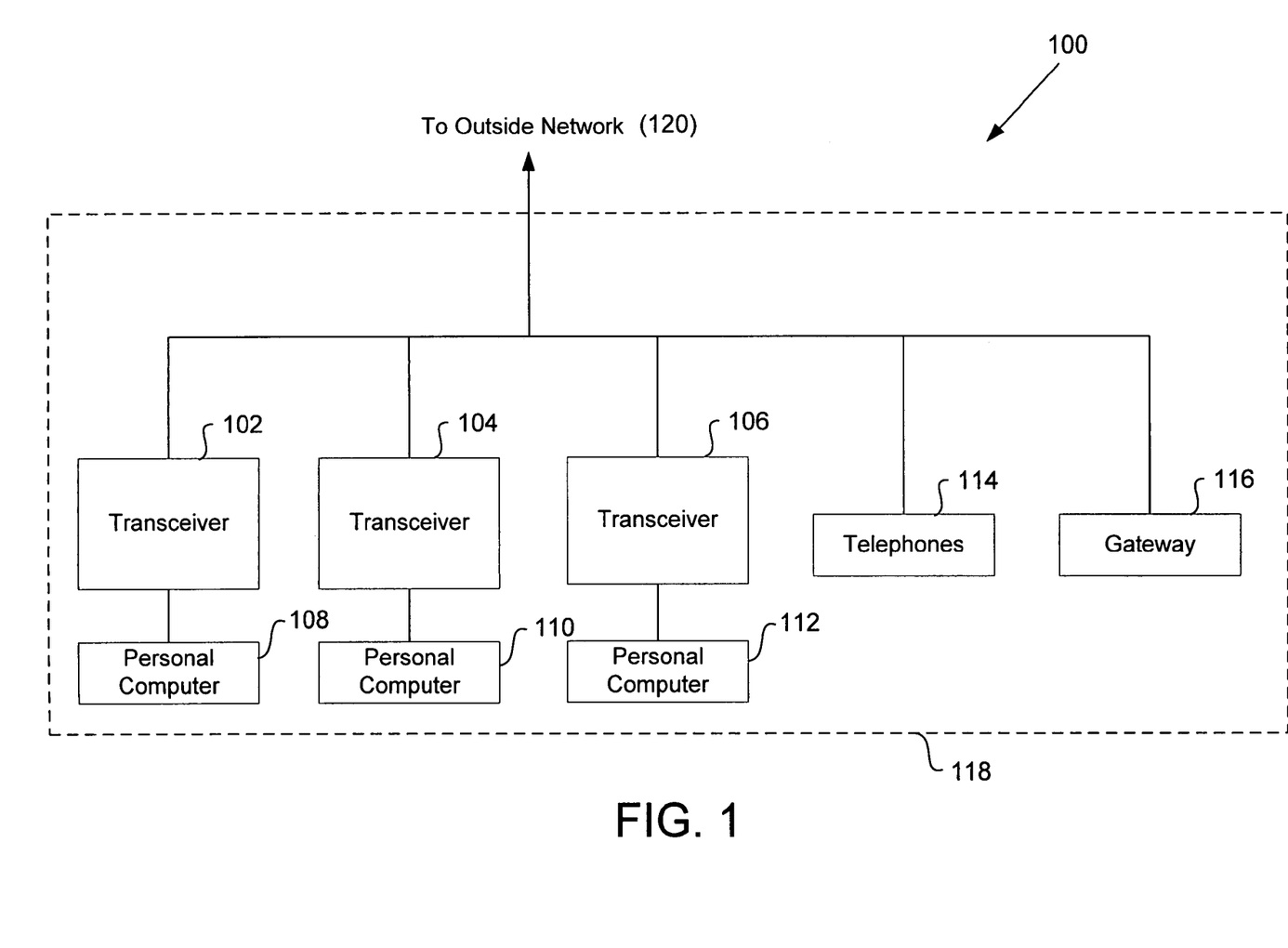
FIG. 1 is a block diagram illustrating a home telephone wiring network.

FIG. 1 is a block diagram illustrating a home telephone wiring network 100 that includes transceivers, or interfaces, 102, 104, and 106 for transmitting and receiving data packets, such as those in accordance with PNT standards, each coupled to personal computers 108, 110, and 112, respectively. The network 100 also includes telephones 114 and a gateway 116. All of these components of the network 100 are disposed in a building 118, such as a home. As shown, the network 100 is coupled to an outside network 120, which in this embodiment is connected to a central office (not shown).

According to one embodiment, any one of the transceivers 102, 104, and 106 can act as a data packet broadcaster with the other two functioning as endpoints. Alternatively, the gateway 116 may function as the data packet broadcaster with the transceiver 102, 104, and 106 acting as endpoints.

Figure 2:
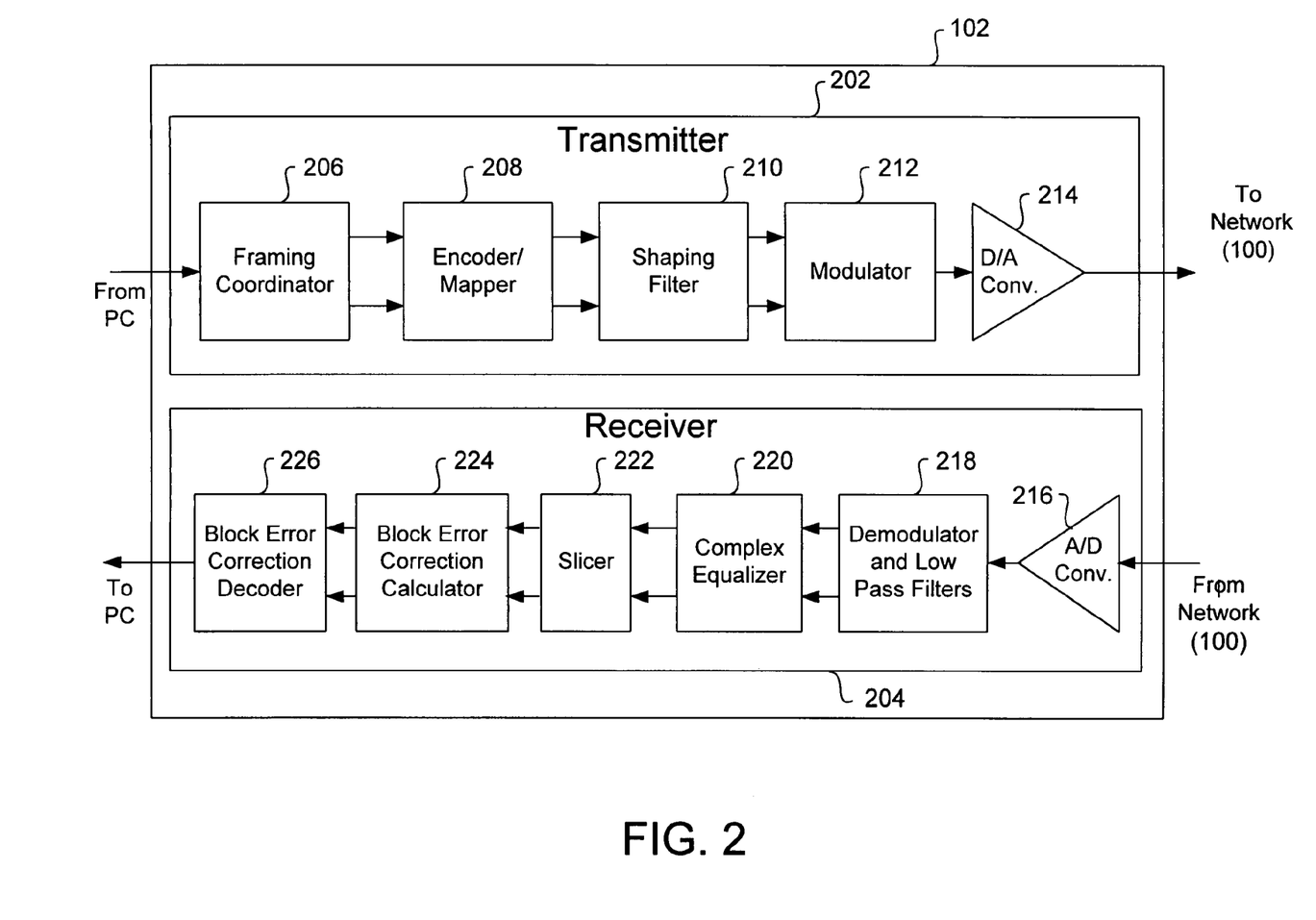
FIG. 2 is a block diagram of a FIG. 1 transceiver.

FIG. 2 illustrates details of the PNT transceiver 102 of FIG. 1. As shown, the transceiver 102 includes a transmitter 202 for transmitting data from the personal computer 108 (FIG. 1) to the network 100 (FIG. 1) and a receiver 204 for receiving data from the network 100 and providing the received data to the personal computer 108. The transceivers 104 and 106 of FIG. 1 are configured in an identical fashion to the transceiver 102.

The transmitter 202 includes a framing coordinator 206, an encoder/mapper 208, a shaping filter 210, a modulator 212, and a digital-to-analog converter 214. In one embodiment, if the transceiver 102 is functioning as a broadcaster, the transmitter 202 receives data bits for transmission from the associated device, such as the personal computer 108 (FIG. 1), and transmits these data packets to various receivers or endpoints on the network 100. The encoder/mapper 208 performs block error correction encoding, such as Reed-Solomon encoding, on the data bits received from the personal computer 108. The data then proceeds through the shaping filter 210 and the modulator 212 before the D/A converter 214 converts the data for transmission through the network 100.

The receiver 204 includes an analog-to-digital converter 216, demodulator and low pass filters 218, a complex equalizer 220, a slicer 222, a block error correction calculator 224, and a block error correction decoder 226. If the transceiver 102 is functioning as an endpoint, data packets are initially received from the network 100 by the receiver 204, and converted to a digital signal by the A/D converter 216. The data then passes through the demodulator and low pass filters 218. Intersymbol interference is suppressed by the complex equalizer 220 before the slicer 222 operates on the data. The block error correction decoder 226 then uses conventional block error correction techniques to remove the errors.

During the data transmission process, the transceivers 102, 104 and 106 (FIG. 1) may synchronize to a new block error correction framing schedule depending on the redundancy requirements of the endpoints. The main component of the broadcaster responsible for framing schedule negotiations is the framing schedule coordinator 206. The coordinator 206 determines a framing schedule for future data transmissions based on schedule requests from the endpoints, and generates a framing schedule identifier which is appended to the header of future data packets.

The endpoint receiver 204 components responsible for the negotiation of the new framing schedule include the slicer 222 and the block error correction calculator 224. The slicer 222, among other things, measures signal-to-noise ratios of data packets as they are received, and forwards these ratios to the block error correction calculator 224. The calculator 224 uses the signal-to-noise ratio to determine the amount of redundancy required by the endpoint in order to correct errors. As mentioned above, the signal-to-noise ratio typically increases over the length of a received packet, thus resulting in a decreasing redundancy requirement. This redundancy requirement, which advantageously decreases over the length of a received packet, is then sent to the broadcaster via the endpoint's transmitter. The details of the framing schedule negotiation process are discussed below with reference to FIG. 7.

Figure 3A:
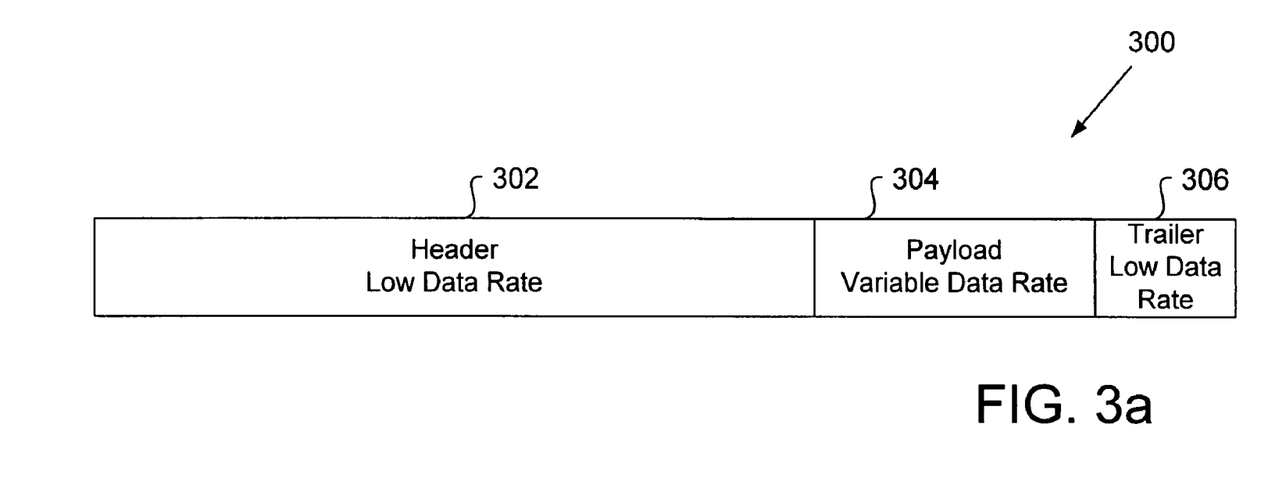
FIG. 3a is a block diagram of a conventional data packet.

A conventional data packet 300 is shown in FIG. 3a. The data packet 300 includes a header 302, a payload 304, and a trailer 306. The header 302 is a data structure containing control information modulated at a low bit rate so that an endpoint receiver has a greater chance of correctly decoding the header data. The header 302 may include information regarding the source of the packet, the destination of the packet, the bit rate of the succeeding payload 304, and the settings of any variables or fields associated with the packet 300. The header 302 will be discussed in more detail in connection with FIG. 3b.

The payload 304 that follows the header 302 is a data-carrying structure containing the message data. The payload 304 may be set at a variable data rate, which is determined by the endpoint after monitoring the signal-to-noise ratios (SNRs) of previous packets, and by signaling that rate to the broadcaster via a robust, low data rate means.

The trailer 306, which comprises the last part of the packet, is a low bit rate data field that contains a cyclic redundancy check (CRC) over the data in the header 302 and payload 304 to determine whether the packet 300 was received without error. Conventionally, if the received CRC indicates an error, the entire packet is discarded because the CRC does not contain enough information to locate and correct the error. The lack of error correction limits the transmission rate because the probability of error generally increases with transmission rate.

Figure 3B:
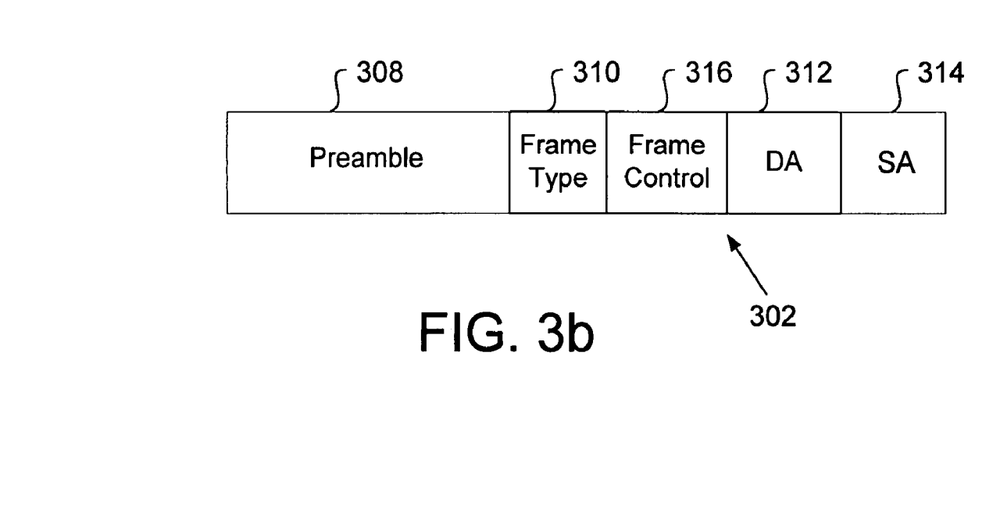
FIG. 3b is a block diagram of a header of the FIG. 3a data packet.

FIG. 3b shows the components of the header 302, which include a fixed preamble 308 and a frame type field 310 as mentioned in reference [1]. The fixed preamble 308 is a repetition of four 16-symbol sequences that allow the receiver to start training—the endpoint will adapt an equalizer to correct for channel dispersion, and possibly attempt to correct for any disparities between the clock frequencies of the broadcaster and the endpoint. Preferably, at the end of the preamble 308, the endpoint device will be sufficiently well tuned to correctly receive and decode the rest of the header 302. The frame type field 310 is typically an 8-bit field responsible for identifying the packet transmission standard, such as G.PNT as determined by the International Telecommunications Union (ITU).

In addition to these fields, the header 302 will need a destination address field 312, a source address field 314, and a frame control field 316 to convey additional information regarding the encoding of the payload. The destination address field 312 identifies the endpoint device or devices receiving the data packet, while the source address field 314 identifies the broadcaster or other device sending the data packet. The frame control field 316 is responsible for the settings of variables or fields associated with a packet.

Figure 4:
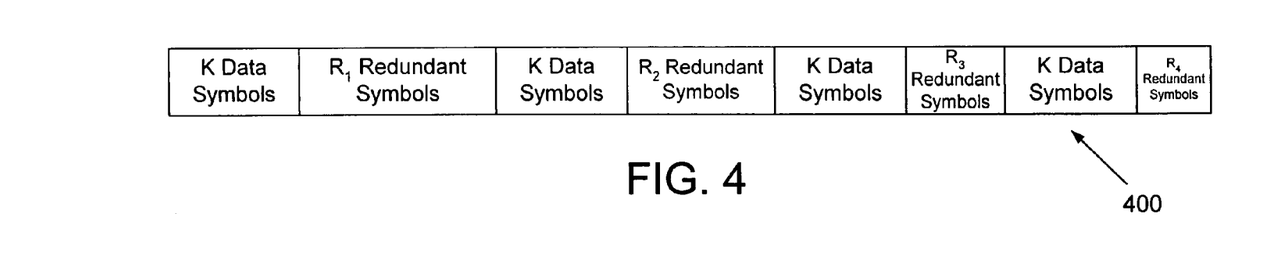
FIG. 4 is a block diagram of one embodiment of the payload of FIG. 3a according to the present system and method.

FIG. 4 is a block diagram illustrating one embodiment of a payload 400 according to the present system and method that contains a variable redundancy framing schedule. In this embodiment, the number of data payload symbols per codeword, K, is constant, while the number of redundant symbols per codeword, R, decreases over time, or over the length of the payload portion of the packet. As discussed earlier, the endpoint device adapts to the transmission channel over time, thus reducing the number of errors during the progression of the data transmission process. Hence, the payload 400 has an increasing ratio of data symbols/redundant symbols over the length of the payload portion of a packet. By using fewer redundant symbols toward the end of the payload portion of a packet, bandwidth is more efficiently used.

Figure 5:
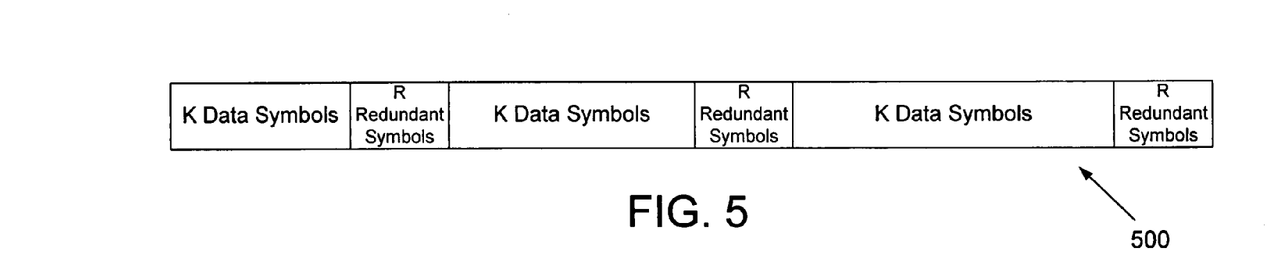
FIG. 5 is a block diagram of an alternative embodiment of the payload of FIG. 3a according to the present system and method.

FIG. 5 shows an alternative embodiment of a payload 500 according to the present system and method. In this embodiment, the number of data payload symbols per codeword, K, increases along the length of the packet 500 while the number of redundant symbols per codeword, R, remains constant. The increase in K with R fixed also reflects the endpoint's improved performance due to adaptation of the receiver to the transmission channel.

An advantage of this payload 500 structure over the payload 400 of FIG. 4 is that the payload 500 allows the encoding and decoding hardware of the transceiver to be custom-made for a particular value of R; thereby potentially reducing the complexity and cost of the system. Yet another embodiment of a packet of the present invention may combine both a decreasing R and an increasing K to account for the adaptation of the endpoint to the transmission channel and the resulting reduction in errors.

Pursuant to one embodiment, at the start of the transmission process, the various transceivers are, by default, set to the framing schedule of a prior transmission or to a default schedule. In order to switch to a new schedule, the transmitters of the broadcaster and the endpoints negotiate to determine a new framing schedule.

Figure 6:
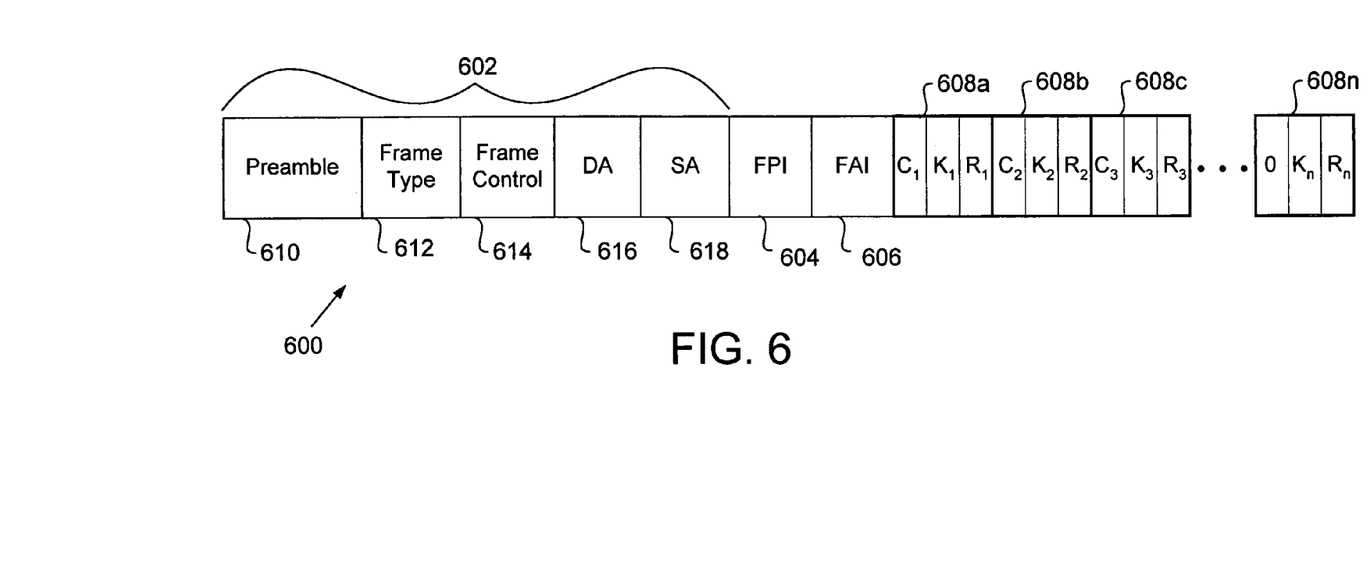
FIG. 6 is a block diagram of a framing indicator packet.

FIG. 6 is a block diagram of a framing schedule packet 600 utilized to negotiate a new framing schedule within the network 100 (FIG. 1). In the preferred embodiment, the framing schedule may use Reed-Solomon error correction coding, although other block or forward error correction coding techniques may be alternatively utilized.

The framing schedule packet 600 includes a header 602, a framing profile identifier field 604, a framing action identifier field 606, and framing indicators 608a-n. The header 602 further includes a preamble 610, a frame type field 612, a frame control field 614, a destination address (DA) field 616, and a source address (SA) 618. The preamble 610 and the frame type field 612 function identically to the preamble 308 and frame type field 310 of FIG. 3.

The frame control field 614 is responsible for the settings of variables or fields associated with the packet 600. The contents of the frame control field 614 can vary according to the requirements of the transmission standard. In the present system, the frame control field 614 identifies the packet 600 as a framing schedule packet and not a data packet.

Because the network 100 can have single (unicast) or multiple (multicast) receivers, the DA and SA fields 616 and 618 are respectively used for identifying the destination and source of the various messages.

Following the SA field 618 is the framing profile identifier field 604, which assigns a number to the succeeding framing schedule transmitted in the current framing schedule packet 600 used to synchronize the transition from a previous framing schedule to the new schedule. The present system and method uses two bits for the framing profile identifier field 604. The framing profile identifier field 604 also signals a change in the framing schedule of the following payload. The framing profile identifier, itself, does not describe the new framing schedule, but merely indicates the existence of a new schedule. For example, suppose that the original framing profile identifier was "1". After evaluating the schedule requests, the broadcaster changes the framing schedule. The framing profile identifier is now set to "2," and all future data packets with the new framing schedule will contain a "2" as the framing profile identifier. Should the framing schedule change again, the "2" will change to "3", or some other value, to indicate that the framing schedule is now different than the previous schedule.

The framing action identifier field 606 indicates the framing schedule packet 600 type with one of three settings. The first setting of the action identifier field 606 is a schedule request sent by an endpoint, which specifies a desired framing schedule for that particular receiver. The broadcaster may receive schedule requests from multiple endpoint devices on the network, and must determine which of the requested framing schedules will be used in future packets sent to the endpoints.

The second setting of the framing action identifier field 606 is a schedule indicator. The broadcaster uses this setting to specify that the indicator packet 600 contains the framing schedule for the next framing profile. Because there may be multiple endpoint devices on the network, the broadcaster may not merely respond to a single endpoint's schedule request. Instead, the broadcaster will choose a schedule that is the most robust of all the received schedule requests. In a multicast system, different endpoints will likely have different abilities to receive a broadcast packet depending on where the endpoints are located in the home. Some endpoints may need more redundancy to achieve the desired data rate than other endpoints. Thus, the broadcaster will preferably choose a schedule that will allow the endpoint device needing the most redundancy to obtain that required redundancy.

The third setting for the framing action identifier field 606 is a schedule acknowledge. Each endpoint device sends a schedule acknowledge after the schedule indicator message has been received by the endpoint. When the broadcaster receives schedule acknowledge messages from all the intended destinations of the previously sent schedule indicator, the broadcaster then switches the framing schedule to the schedule defined in the associated schedule indicator.

The scheduling information follows the framing action identifier field 606, and consists of a stream of framing indicators 608*a-n*. If the message is a schedule request, the framing indicators 608*a-n* will consist of the framing schedule desired by the endpoint sending the schedule request. If the message is a schedule indicator, the framing indicators 608*a-n* will reflect the new framing schedule. And finally, if the message is a schedule acknowledge, then the framing indicators 608*a-n* will be identical to the framing indicators received in the schedule indicator message.

Each framing indicator 608*a-n* has three fields indicating: the number C of codewords for which the coding parameters shall be active, the number K of payload symbols per codeword, and the number R of redundant symbols per codeword. The last framing indicator 608*n* preferably has a zero or other identifier in the number of codewords field indicating that the associated K and R values are valid for the remainder of the packet.

The ordering of the framing indicators 608*a-n* in the framing schedule message reflects the order to be followed during the data transmission. For example, consider a case where the first framing indicator 608*a* has C=2, K=32, R=8; the second coding indicator 608*b* has C=4, K=64, R=8; and the third coding indicator 608*c* has C=0, K=247, R=8 (thus K is increasing while R remains constant). Data packets using this schedule will have the first two codewords sent with a framing of K=32 and R=8. The next four codewords will have K=64 and R=8, and all succeeding codewords will have K=247 and R=8. These K values are the maximum values of the data payload. Thus, if the payload terminates before a codeword is filled with K symbols, the broadcaster appends the redundant symbols and truncates the codeword. The shortened codeword size is easy to detect because the endpoint will detect the end of the packet.

Figure 7:
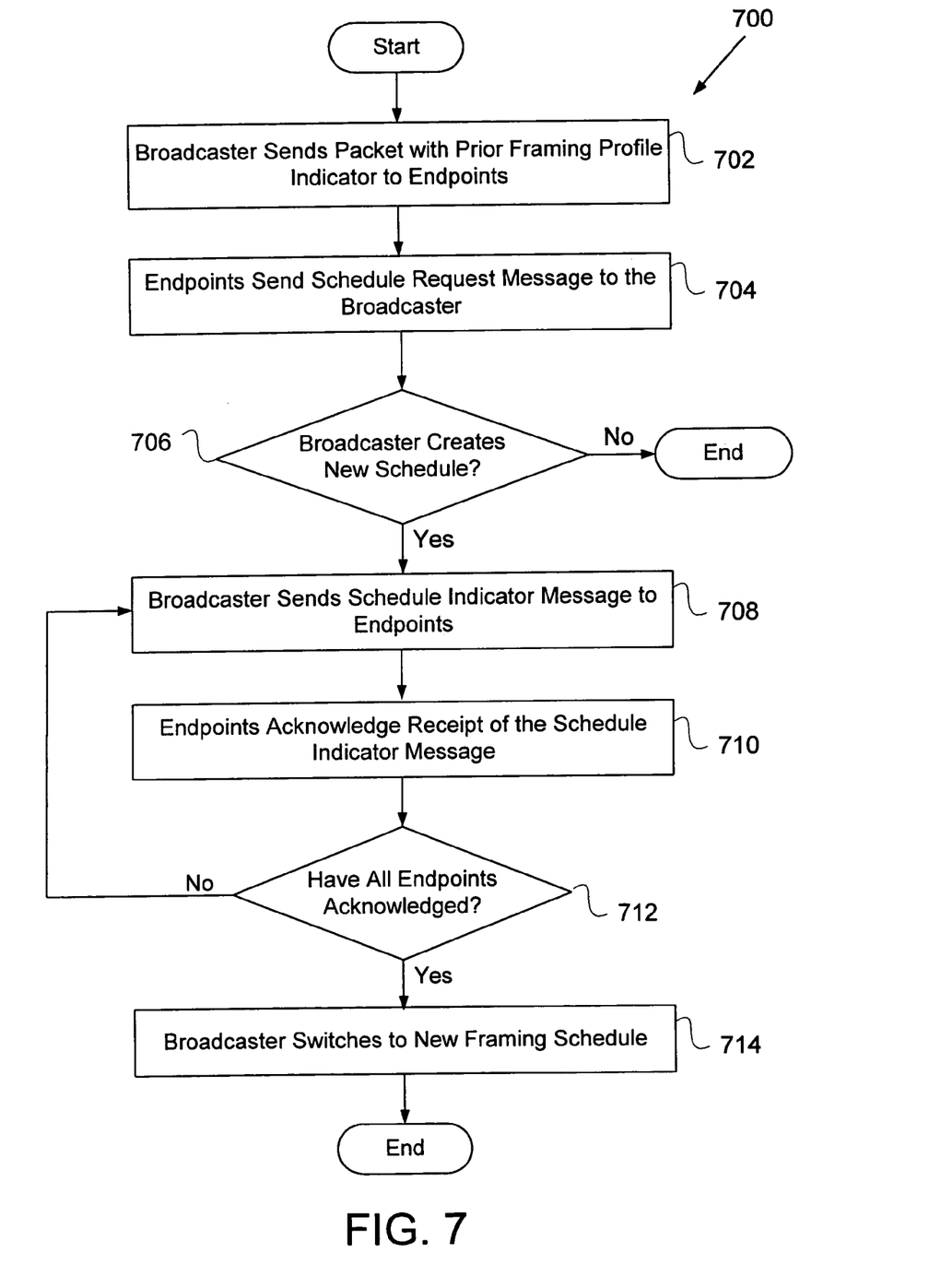
FIG. 7 is a flowchart illustrating one embodiment of a method of framing schedule negotiation.

FIG. 7 illustrates a framing schedule negotiation flowchart 700 corresponding to the network 100 of FIG. 1. The flowchart 700 describes one embodiment of the operation of a transceiver 102, which acts as a broadcaster, and transceivers 104 and 106, that function as endpoints. Thus, the broadcaster 102 is the data packet transmitting device that determines and controls the block error correction framing schedule, and the endpoints 104 and 106 are the packet receiving devices, which may have different redundant symbol requests.

In block 702, the broadcaster 102 begins by sending a data packet, or a set of data packes, over the network 100 to the endpoints 104 and 106. This packet is transmitted using a previously negotiated framing schedule identified by a particular framing profile identifier located inside the header that prepends the data packet. Alternatively, this packet may be transmitted according to certain predetermined, default parameters and schedules.

In block 704, endpoints 104 and 106 each determine whether a different redundancy schedule is needed or desired. In one embodiment, a slicer 222 (FIG. 2) of the endpoint 104 samples data and determines a signal-to-noise ratio for different points along the length of the packet, and forwards this error measurement to the block error correction calculator 224 (FIG. 2). The calculator 224 then uses the error measurement to determine the amount of redundancy required by the associated endpoint device. After sampling numerous data packets, the endpoint device will likely have a good estimate of the signal-to-noise ratio as a function of packet length, and will have calculated its redundancy requirement according to the measured signal-to-noise ratio. The endpoint device then calculates a redundancy schedule according to its redundancy requirements, and transmits a schedule request to the broadcaster to inform the broadcaster of the endpoint's redundancy requirements. In one embodiment, the endpoint device only sends the schedule request if an improvement can be made to the current schedule.

In block 706, the broadcaster 102 determines if a new framing schedule is required. If a new framing schedule will not improve the error correction capabilities of the endpoints, then the negotiation process is ended. However, if the broadcaster 102 determines a need for a new framing schedule, the new framing schedule is created based on the schedule request from the responding endpoint requiring the most redundancy in the network 100. Subsequently, the broadcaster 102 sends the new framing schedule, such as the framing schedule 600 (FIG. 6) to endpoints 104 and 106 in block 708.

In block 710, the endpoints 104 and 106 acknowledge receipt of the new framing schedule by transmitting a schedule acknowledge message that "echoes" the new framing schedule and framing profile indicator 604.

The broadcaster 102 then determines whether all the endpoints have acknowledged receipt of the new framing schedule in block 712. If the broadcaster 102 has not received a schedule acknowledge from each of the endpoint devices then the broadcaster 102 will, after a predetermined time period, sense a timeout condition, and retransmit the schedule indicator message with the new framing indicator. The broadcaster 102 will continue to periodically retransmit the schedule indicator message until all the endpoints 104 and 106 have responded with a schedule acknowledge message.

Once all of the endpoints 104 and 106 have acknowledged receipt of the new framing schedule, the broadcaster 102 switches all future data packets to follow the new framing schedule in block 714. This schedule switch is identified by a new framing profile indicator 604 placed in all future packets using the new framing schedule.

Although, FIG. 7 describes one embodiment of the framing schedule negotiation with one broadcaster 102 and two endpoints 104 and 106, the system and method may be practiced in a unicast environment or, alternatively, in a larger multicast environment.

The present invention may also be practiced without the timeout condition described above. Instead, the broadcaster 102 can periodically check for Schedule Requests and change the framing schedule accordingly. Alternatively, the broadcaster 102 may change the framing schedule every time it receives a new Schedule Request requiring more redundancy from an endpoint.

The invention has been described above with reference to specific embodiments. It will be apparent to those skilled in the art that various modifications may be made and other embodiments can be used without departing from the broader scope of the invention. Therefore, these and other variations upon the specific embodiments are intended to be covered by the present invention, which is limited only by the appended claims.

What is claimed is:

1. A transmitting device for transmitting data packets over a network, the transmitting device comprising:
   a framing coordinator for creating a decreasing redundancy data packet having a increasing ratio of message symbols/redundant symbols over the length of the packet; and
   a transmitter for transmitting the decreasing redundancy data packet over the network.

2. The system of claim 1 further comprising: at least one codeword within the decreasing redundancy data packet wherein the number of message symbols per codeword remains constant and the number of redundant symbols decreases over the length of the packet.

3. The system of claim 1 further comprising: at least one codeword within the decreasing redundancy data packet wherein the number of message symbols per codeword increases over the length of the packet and the number of redundant symbols per codeword remains constant.

4. The system of claim 1 further comprising: at least one codeword within the decreasing redundancy data packet wherein the number of message symbols per codeword increases and the number of redundant symbols per codeword decreases over the length of the packet.

5. A transceiver for transmitting and receiving data over a network, the transceiver comprising:
   a slicer for determining a signal-to-noise ratio of received decreasing redundancy data packets as a function of received packet length;
   a block error correction calculator coupled to the slicer for determining redundancy requirements for the transceiver according to the determined signal-to-noise ratio; and
   a transmitter coupled to the block error correction calculator for transmitting a schedule request packet over the network, the schedule request packet including the decreasing redundancy requirements of the transceiver as determined by the block error correction calculator to inform a transmitting network device of the decreasing redundancy requirement of the transceiver.

6. A system for block error correction on data packets in digital communication over a network, the system comprising:
   a broadcaster device coupled to a network for broadcasting decreasing redundancy data packets over the network according to a framing schedule;
   a first endpoint device coupled to the network for receiving the decreasing redundancy data packets, the first endpoint device having a first decreasing redundancy requirement;
   a second endpoint device coupled to the network for receiving the decreasing redundancy data packets, the second endpoint device having a second decreasing redundancy requirement; and
   the broadcaster being configured to determine the framing schedule based on the greater of the first and second decreasing redundancy requirement.

7. The system of claim 6 wherein the block error correction is performed utilizing Reed-Solomon coding.

8. The system of claim 6 wherein the broadcaster device comprises a schedule framing coordinator, said schedule framing coordinator determining a new framing schedule based on decreasing redundancy requirements of at least one of the endpoint devices.

9. The system of claim 6 wherein the endpoint device comprises a slicer and a block error correction calculator for sampling the data and determining redundancy requirements for at least one of the endpoint devices.

10. A method for negotiating the degree of redundancy in data packets transmitted by a broadcasting device over a network to multiple endpoint devices comprising:
    determining a first redundancy requirement for a first endpoint device, the first redundancy requirement comprising an increasing ratio of message symbols/redundant symbols over the length of a packet;
    determining a second redundancy requirement for a second endpoint device, the second redundancy requirement comprising an increasing ratio of message symbols/redundant symbols over the length of a packet;
    selecting a framing schedule based on the redundancy requirement having the greatest amount of redundancy; and
    transmitting data packets over the network to the first and second endpoint devices according to the framing schedule.

11. The method of claim 10 wherein the determining a first and second redundancy requirement further comprises calculating a signal-to-noise ratio in a slicer.

12. The method of claim 11 further comprising the calculating the redundancy requirement in a block error correction calculator based on the signal-to-noise ratio.

13. The method of claim 10 wherein the selecting further comprises waiting for all endpoints devices in a network to respond with a framing schedule request.

14. The method of claim 10 wherein the selecting further comprises checking for framing schedule requests periodically for higher redundancy requests.

15. The method of claim 10 wherein the selecting further comprises utilizing the framing schedule of each higher redundancy framing schedule request as the schedule request is received by the broadcaster device.

16. The method of claim 10 wherein the selecting further comprises sending the framing schedule to the endpoint devices.

17. The method of claim 10 wherein the selecting further comprises waiting for a schedule acknowledge message sent by all endpoint devices in the network to the broadcaster device.

18. The method of claim 17 wherein the selecting further comprises periodically resending the framing schedule to the endpoint devices when less than all endpoint devices in the network respond with the schedule acknowledge message.

19. A system for negotiating a framing schedule for block error correction on data packets in digital communications comprising:
    means for receiving data packets at an endpoint device;
    means for calculating an error correction redundancy requirement for the endpoint device;
    means for transmitting the calculated redundancy requirement from the endpoint device over the network to a broadcaster device;
    means for determining a framing schedule in the broadcaster device based on the error correction redundancy requirement of the endpoint device; and
    means for transmitting a data packet having an increasing ratio of message signals/redundant symbols according to the framing schedule.

20. A method for negotiating the degree of redundancy in data packets transmitted by a broadcasting device over a network to multiple endpoint devices comprising:
    means for determining a first redundancy requirement for a first endpoint device, the first redundancy requirement comprising an increasing ratio of message symbols/redundant symbols over the length of a packet;

means for determining a second redundancy requirement for a second endpoint device, the second redundancy requirement comprising an increasing ratio of message symbols/redundant symbols over the length of a packet;

means for selecting a framing schedule based on the redundancy requirement having the greatest amount of redundancy; and means for transmitting data packets over the network to the first and second endpoint devices according to the framing schedule.

21. A method for negotiating the degree of redundancy in data packets transmitted by a broadcasting device over a network to multiple endpoint devices comprising:

determining a first redundancy requirement for a first endpoint device, the first redundancy requirement comprising an increasing ratio of message symbols/redundant symbols over the length of a packet;

determining a second redundancy requirement for a second endpoint device, the second redundancy requirement comprising an increasing ratio of message symbols/redundant symbols over the length of a packet;

selecting a framing schedule based on the redundancy requirement having the greatest amount of redundancy after waiting for all endpoints devices in a network to respond with a framing schedule request; and transmitting data packets over the network to the first and second endpoint devices according to the framing schedule.

22. A method for negotiating the degree of redundancy in data packets transmitted by a broadcasting device over a network to multiple endpoint devices comprising:

determining a first redundancy requirement for a first endpoint device, the first redundancy requirement comprising an increasing ratio of message symbols/redundant symbols over the length of a packet;

determining a second redundancy requirement for a second endpoint device, the second redundancy requirement comprising an increasing ratio of message symbols/redundant symbols over the length of a packet;

selecting a framing schedule based on the redundancy requirement having the greatest amount of redundancy after waiting for a schedule acknowledge message sent by all endpoint devices in the network to the broadcaster device; and transmitting data packets over the network to the first and second endpoint devices according to the framing schedule.

23. A method for negotiating the degree of redundancy in data packets transmitted by a broadcasting device over a network to multiple endpoint devices comprising:

determining a first redundancy requirement for a first endpoint device, the first redundancy requirement comprising an increasing ratio of message symbols/redundant symbols over the length of a packet;

determining a second redundancy requirement for a second endpoint device, the second redundancy requirement comprising an increasing ratio of message symbols/redundant symbols over the length of a packet;

selecting a framing schedule based on the redundancy requirement having the greatest amount of redundancy after waiting for a schedule acknowledge message sent by all endpoint devices in the network to the broadcaster device and periodically resending the framing schedule to the endpoint devices when less than all endpoint devices in the network respond with the schedule acknowledge message; and transmitting data packets over the network to the first and second endpoint devices according to the framing schedule.

24. A method, comprising:

determining the redundancy requirements of a plurality of end point devices, wherein the redundancy requirements include an increasing ratio of message symbols/ redundant symbols; and selecting at least one framing schedule based on one of the redundancy requirements having the greatest amount of redundancy after receiving framing schedule requests from the plurality of end point devices.

* * * * *